(12) United States Patent
Schmitt

(10) Patent No.: US 7,073,224 B2
(45) Date of Patent: *Jul. 11, 2006

(54) TELESCOPIC POLYGON RADIAL DRIVE COUPLING FOR A DRAIN CLEANING MACHINE

(75) Inventor: Randall Paul Schmitt, Clinton Township, MI (US)

(73) Assignee: Masco Corporation, Taylor, MI (US)

( * ) Notice: Subject to any disclaimer, the term of this patent is extended or adjusted under 35 U.S.C. 154(b) by 667 days.

This patent is subject to a terminal disclaimer.

(21) Appl. No.: 10/174,135

(22) Filed: Jun. 18, 2002

(65) Prior Publication Data

US 2003/0229956 A1    Dec. 18, 2003

(51) Int. Cl.
*B08B 9/02* (2006.01)

(52) U.S. Cl. .............. 15/104.33; 15/104.31; 242/404; 242/593; 403/322.2

(58) Field of Classification Search ............. 15/104.33, 15/104.31; 242/597.1, 404, 593, 570, 387, 242/597.8; 403/325, 322.1
See application file for complete search history.

(56) References Cited

U.S. PATENT DOCUMENTS

| 2,111,527 | A | | 3/1938 | Blanc |
| 2,468,490 | A | | 4/1949 | Di Joseph |
| 3,121,244 | A | | 2/1964 | Hunt |
| 3,162,878 | A | | 12/1964 | Agostino |
| 3,605,158 | A | | 9/1971 | Russell |
| 3,958,293 | A | | 5/1976 | Irwin |
| 4,287,630 | A | | 9/1981 | Perez |
| 4,364,139 | A | | 12/1982 | Babb et al. |
| 4,570,281 | A | | 2/1986 | Boelens |
| 4,716,613 | A | | 1/1988 | Irwin |
| 4,914,775 | A | | 4/1990 | Kirk |
| 4,916,772 | A | * | 4/1990 | Russell et al. ........... 15/104.33 |
| 5,031,263 | A | | 7/1991 | Babb et al. |
| 5,031,276 | A | | 7/1991 | Babb et al. |
| 5,193,242 | A | | 3/1993 | Irwin |
| 6,618,892 | B1 | * | 9/2003 | Schmitt ................... 15/104.33 |

* cited by examiner

*Primary Examiner*—John Kim
*Assistant Examiner*—Abraham Bahta

(57) ABSTRACT

A coupling assembly for a portable drain cleaning machine includes a polygonal adapter mounted to a motor output shaft through a threaded interface. A polygon adapter threads over the motor output shaft in a locked male/female relationship to transmit rotation therebetween. A polygonal outer segment of the polygonal adapter telescopes into a polygonal inner segment of a sleeve mounted to the drum. The sleeve slides into a fixed cylindrical member and over the polygonal adapter to removably mount the drum. Rotation of the motor output shaft rotates the polygonal adapter which rotates the sleeve and the drum.

17 Claims, 3 Drawing Sheets

TELESCOPIC POLYGON RADIAL DRIVE COUPLING FOR A DRAIN CLEANING MACHINE

BACKGROUND OF THE INVENTION

The present invention relates to a drain cleaning machine, and more particularly to a coupling between a rotatable drum and a motor.

Conventional drum type drain cleaning machines typically include a frame structure supporting a rotatable snake drum and a drive motor arrangement for rotating the drum. The frame structure also supports a snake feeding arrangement by which the snake or cable is axially displaced relative to the rotating drum during use of the machine. The snake coiled within the rotatable drum is displaced by the feeding arrangement and inserted into a pipe or drain to be cleaned. Rotation of the drum rotates the snake to achieve such cleaning.

The rotatable drum in known drain cleaning machines may typically be removed from the support frame and drive arrangement to facilitate replacement of the drum with one containing a snake having a different diameter and to make the separate components more mobile. Disadvantageously, conventional removable drums require tools to disassemble the rotatable drum from the support frame. This, of course, requires access to the proper tools and is also somewhat time consuming for the operator.

Relatively small drain cleaning machines utilize a motor typical of an electric drill. The gear motor provides rotational power to the drum through an in-line coupling. Space and cost considerations may limit the size of the bearing. A relatively small bearing increases the bending load upon the drum shaft which may result in a rotational imbalance and reduced power transfer from the motor.

Accordingly, it is desirable to provide a rotatable drum coupling assembly which allows removal of the drum while assuring effective rotational balance.

SUMMARY OF THE INVENTION

The portable drain cleaning machine includes a support frame assembly which supports a rotatable snake drum, a drum drive assembly, and a snake feeding mechanism. The drive assembly includes an electric motor which drives the drum through a coupling assembly.

The coupling assembly includes a sleeve that is mounted to the drum through a fastener or the like. The sleeve includes a key which engages the hub to prevent relative rotation therebetween. The sleeve is rotatably and removably mounted within a fixed cylindrical member fixed to the support frame assembly.

A polygonal adapter is mounted to the motor output shaft through a threaded interface. The polygonal adapter is substantially tubular with a polygonal outer segment and a threaded inner segment. The threaded inner segment is threaded to engage the motor output shaft which is typically of a threaded profile. The threaded inner segment fits over the motor output shaft in a locked male/female relationship to transmit rotation therebetween.

The polygonal outer segment of the polygonal adapter telescopes into a polygonal inner segment of the sleeve. The sleeve slides into the fixed cylindrical member and over the polygonal adapter to mount the drum. Rotation of the motor output shaft rotates the polygonal adapter which rotates the sleeve and thereby rotates the drum. The relatively long polygonal interfaces assure effective rotational load transmission and uncomplicated drum removal.

The present invention therefore provides a rotatable drum coupling assembly which allows removal of the drum while assuring effective rotational balance.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
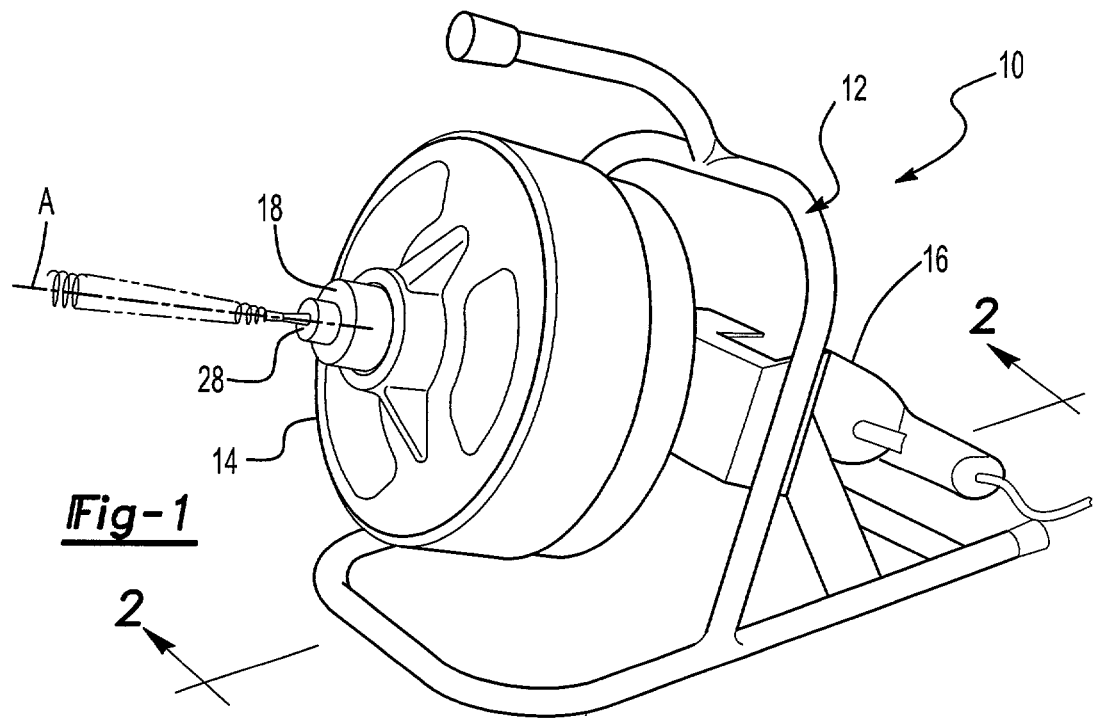
FIG. 1 is a general perspective view of a drain cleaning machine having a removable rotatable drum according to the present invention.

FIG. 1 illustrates a general perspective view of a portable drain cleaning machine 10 including a support frame assembly 12 which supports a drum 14, a drum drive assembly 16, and a feed assembly 18.

Figure 2:
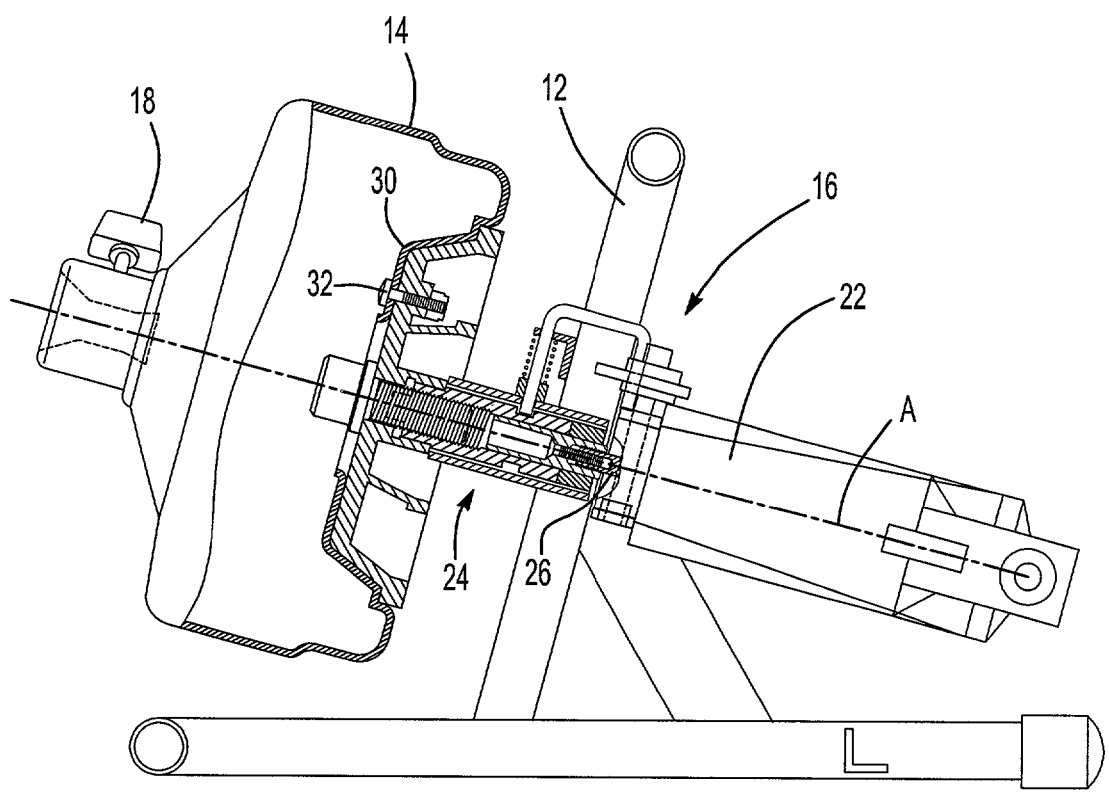
FIG. 2 is a sectional view of the drain cleaning machine taken along axis of rotation A.

Referring to FIG. 2, a sectional view taken along axis of rotation A is illustrated. The drum drive assembly 16 preferably includes an electric motor 22 which drives the drum 14 through a coupling assembly 24. The motor 22 is preferably mounted along the axis of rotation A upon which the drum 14 and electric motor output shaft 26 rotate.

The drum 14 contains a coiled flexible plumbers snake 28 which extends outwardly through the feed assembly 18. Assembly 18 preferably includes a clamp which optionally provides rotational torque to the flexible plumbers snake 28 (FIG. 1) to restrict snake extension/retraction relative the drum 14 during operation of the machine 10. Rotation of the electric motor output shaft 26 rotates the drum 14 about axis of rotation a through coupling assembly 24.

Figure 3:
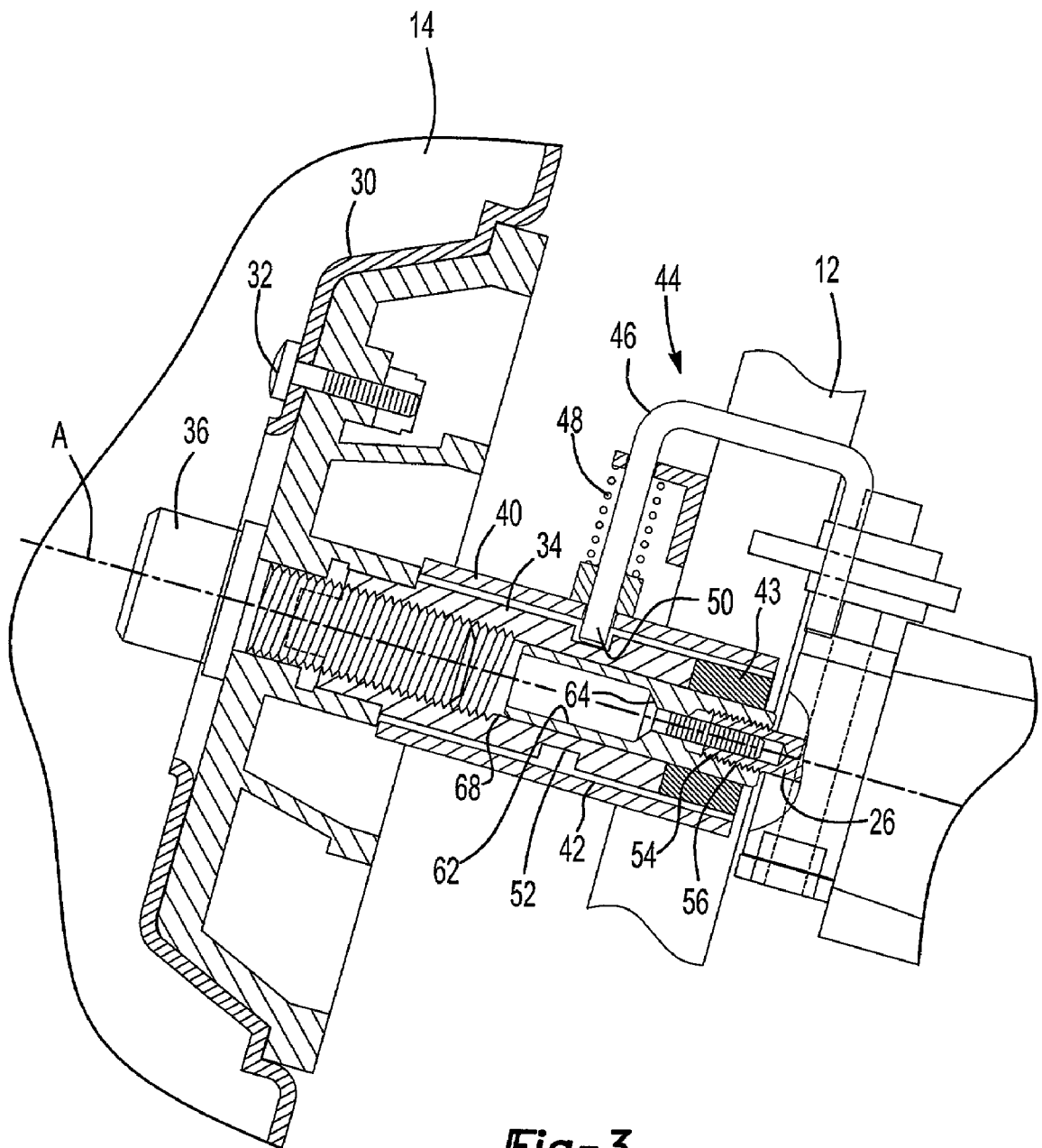
FIG. 3 is an expanded view of the coupling assembly.

Referring to FIG. 3, a hub 30 is mounted to the drum 14 by at least one fastener 32 such as a screw and nut or the like. The hub 30 is preferably spider like having a plurality arms which radially extend from axis A. Each arm is attached to the drum 14 through fastener 32.

The coupling assembly 24 includes a sleeve 34 that is mounted to the hub 30 through a fastener 36 or the like. Preferably, the fastener is threaded directly into the sleeve 34. The sleeve 34 includes a key 38 (FIG. 4) which engages the hub 30 to prevent relative rotation therebetween.

The sleeve 34 is rotatably and removably mounted within a fixed cylindrical member 40 fixed to the support frame assembly 12. The fixed cylindrical member 40 preferably includes one or more bushings or bearings 42 within which the sleeve 34 rotates, however, the sleeve 34 may directly contact the inner diameter of the fixed cylindrical member 40 for rotation therein. An elongated cylindrical contact area is provided to effectively support the overhung drum 14 load. Combined together, the sleeve 34, polygonal adapter 54, and support spacer 43, make a continuous shaft fully supported completely within the fixed cylindrical member 40. Thus, providing maximum bearing contact area and alignment. Heretofore the contact area was relatively limited due to separation of motor adapter and drum sleeve at butt coupling. Alternatively or in addition, a support spacer 43 is separately mounted over motor output shaft 26 and 54 polygon adapter to provide further centering and rotational support for the motor output shaft 26 within the fixed cylindrical member 40.

A rotary drum release assembly 44 and actuating handle 46 are mounted to the support frame 12. The actuating handle 46 is preferably spring biased toward the sleeve 34 by a spring 48 or the like. The actuating handle 46 includes an end segment 50 which passes through the fixed cylindrical member 40 to ride within a groove 52 of sleeve 34. Pulling upon actuating handle 46 disengages end segment 50 from groove 52 thereby allowing axial removal of sleeve 34 and attached drum 14. It should be understood that various retention mechanisms will benefit from the present invention.

Figure 4:
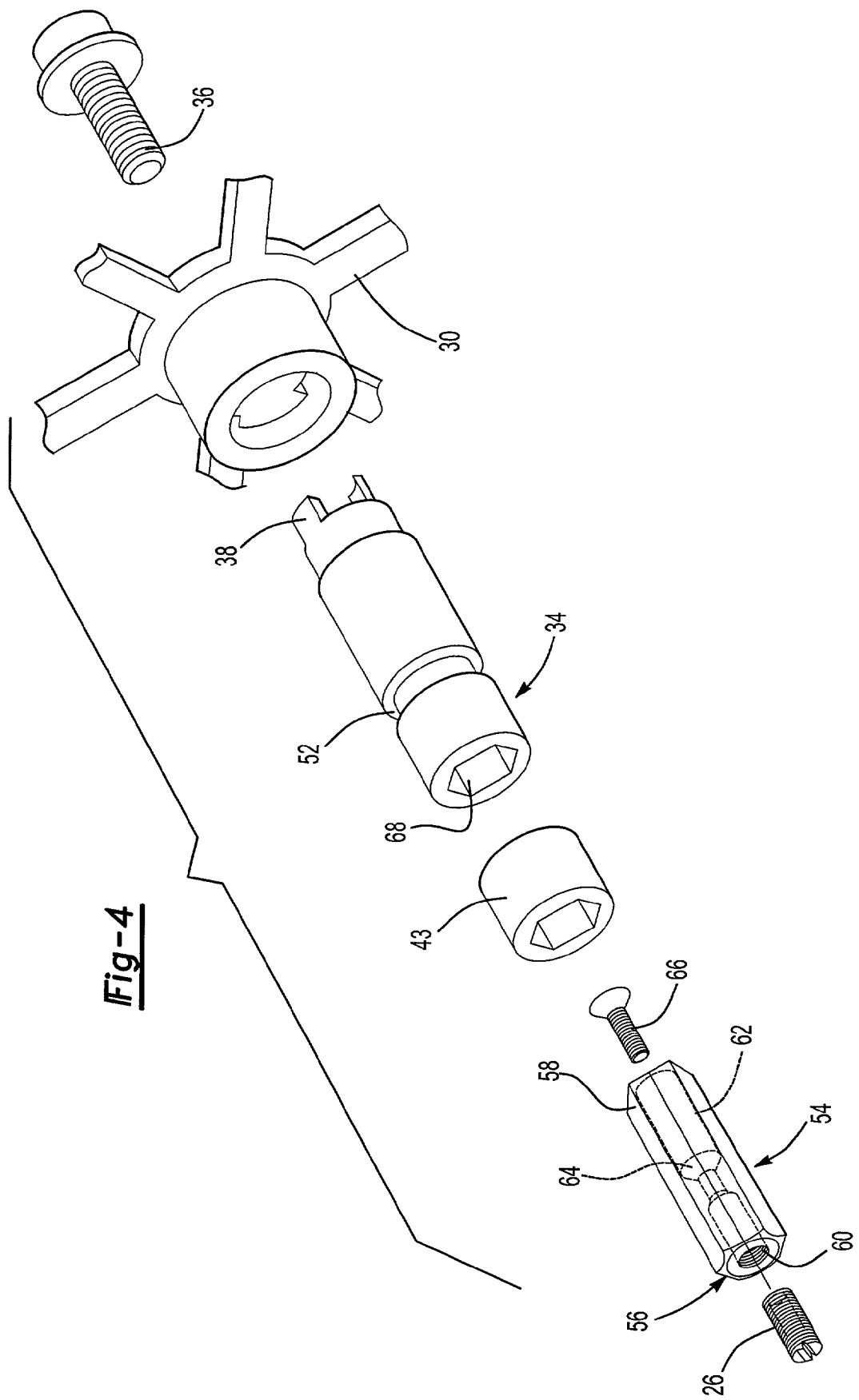
FIG. 4 is an exploded view of the coupling assembly according to the present invention.

A polygonal adapter 54 is mounted to the motor output shaft 26 through a threaded interface 56. It should be understood that other interfaces such as splines or the like will also benefit from the present invention. The polygonal adapter 54 is substantially tubular with a polygonal outer segment 58 and a threaded inner segment 60 (FIG. 4). The threaded inner segment 60 is preferably threaded to engage the motor output shaft 26 which is typically of a threaded profile. The threaded inner segment 60 threads on the motor output shaft 26 in a male/female relationship.

A cylindrical inner segment 62 is located opposite the threaded inner segment 60. A step 64 provides a clamping surface between the cylindrical inner segment 62 and the fastener 66. A fastener 66 or the like passes through the cylindrical inner segment 62, contacts step 64 and threads into the motor output shaft 26 with a reverse left hand thread to provide a secure attachment therebetween. That is, polygonal adapter 54 rotates with the motor output shaft 26. The opposing thread arrangement assures that the polygonal adapter 54 does not work loose from the motor output shaft 26 irrespective of rotational direction.

The polygonal outer segment 58 of polygonal adapter 54 telescopes into a sleeve polygonal inner segment 68 of sleeve 34 in a male/female relationship. Sleeve 34 slides into fixed cylindrical member 40 and over polygonal adapter 54 to mount the drum 14. Rotation of the motor output shaft 26 rotates the polygonal adapter 54 which rotates sleeve 34 and thereby rotate drum 14. The relatively long polygonal interfaces assure effective rotational load transmission and uncomplicated drum mounting.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A rotary drum coupling assembly for a drain cleaning machine comprising:
    a fixed cylindrical member defining an axis of rotation;
    a polygonal adapter mountable to an output drive shaft along said axis of rotation, said polygonal adapter comprising a polygonal outer segment; and
    a sleeve mountable to the rotary drum, said sleeve having a polygonal inner segment to receive said polygonal outer segment wherein said sleeve is rotatable with said fixed cylindrical member.

2. The coupling assembly as recited in claim 1, further comprising a bearing between said fixed cylindrical member and said sleeve.

3. The coupling assembly as recited in claim 1, further comprising a key extending from said sleeve, said key engageable with said rotary drum to prevent rotation therebetween.

4. The coupling assembly as recited in claim 1, further comprising a fastener to retain said sleeve to said rotary drum.

5. The coupling assembly as recited in claim 1, further comprising a groove about an outer diameter of said sleeve.

6. The coupling assembly as recited in claim 5, further comprising an actuating handle comprising an end segment to engage said groove through said fixed cylindrical member.

7. The coupling assembly as recited in claim 1, wherein said polygonal adapter comprises a cylindrical inner segment and a threaded inner segment.

8. The coupling assembly as recited in claim 7, further comprising a fastener to retain said threaded adapter to said output drive shaft.

9. The coupling assembly as recited in claim 1, further comprising a support spacer mounted about said output drive shaft and polygon adapter.

10. A rotary drum coupling assembly for a drain cleaning machine comprising:
    a fixed cylindrical member defining an axis of rotation;
    a polygonal adapter comprising a polygonal outer segment, a threaded inner segment and a cylindrical inner segment, said threaded inner segment mountable over an output drive shaft; and
    a sleeve mountable to the rotary drum, said sleeve having a polygonal inner segment telescopically mountable over said polygonal outer segment, said sleeve rotatable within said fixed cylindrical member.

11. The coupling assembly as recited in claim 10, further comprising a key extending from said sleeve, said key engageable with said rotary drum to prevent rotation therebetween.

12. The coupling assembly as recited in claim 10, further comprising a fastener to retain said sleeve to said rotary drum.

13. The coupling assembly as recited in claim 10, further comprising a groove about an outer diameter of said sleeve.

14. A drain cleaning machine comprising:
    a support frame;
    a removable rotary drum;

a fixed cylindrical member mounted to said support frame;

an electric motor comprising a threaded output drive shaft which rotates about an axis of rotation;

a polygonal adapter comprising a polygonal outer segment, a threaded inner segment and a cylindrical inner segment, said threaded inner segment mountable and locked over said threaded output drive shaft; and a sleeve mounted to said rotary drum, said sleeve having a polygonal inner segment telescopically mountable over said polygonal outer segment and rotatable within said fixed cylindrical member.

15. The drain cleaning machine as recited in claim 14, further comprising a bearing between said fixed cylindrical member and said sleeve.

16. The drain cleaning machine as recited in claim 14, further comprising a key extending from said sleeve, said key engageable with said rotary drum to prevent rotation therebetween.

17. The drain cleaning machine as recited in claim 14, further comprising a fastener to retain said sleeve to said rotary drum.

* * * * *